Figure 1:
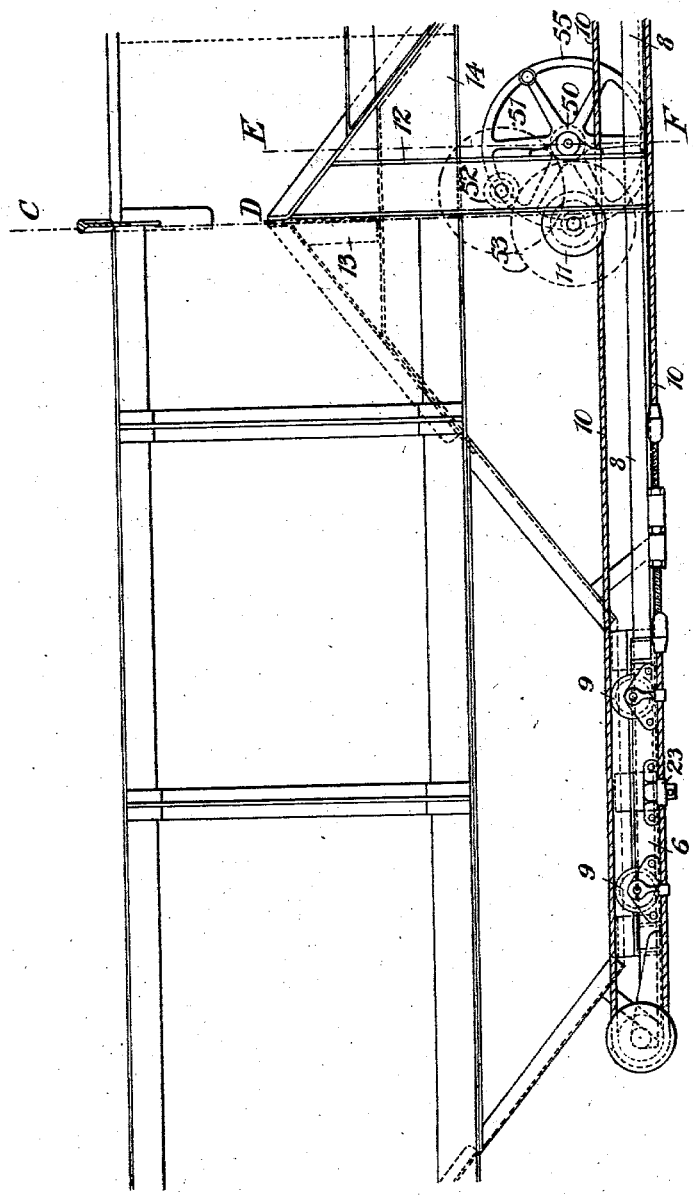

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 1.

Inventors
George H. Sheffield
James D. Twinberrow

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 2.

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 3.
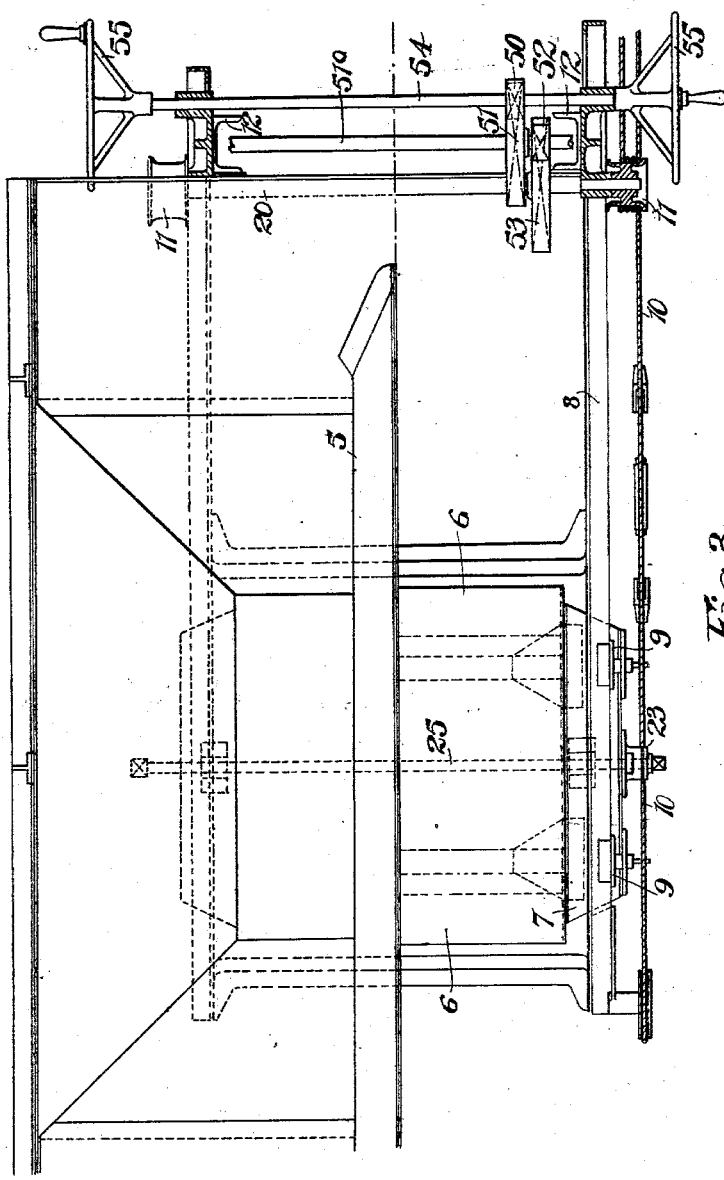

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.

NO MODEL. 13 SHEETS—SHEET 4.

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 5.

Attest:
Inventors
George H. Sheffield
James D. Twinberrow
by Richards & Co.
Attys.

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.

NO MODEL. 13 SHEETS—SHEET 6.

WITNESSES
H. M. Kuehne
J. M. Dowling

INVENTORS
George Harrison Sheffield
James Denis Twinberrow
By Richard
ATTORNEYS

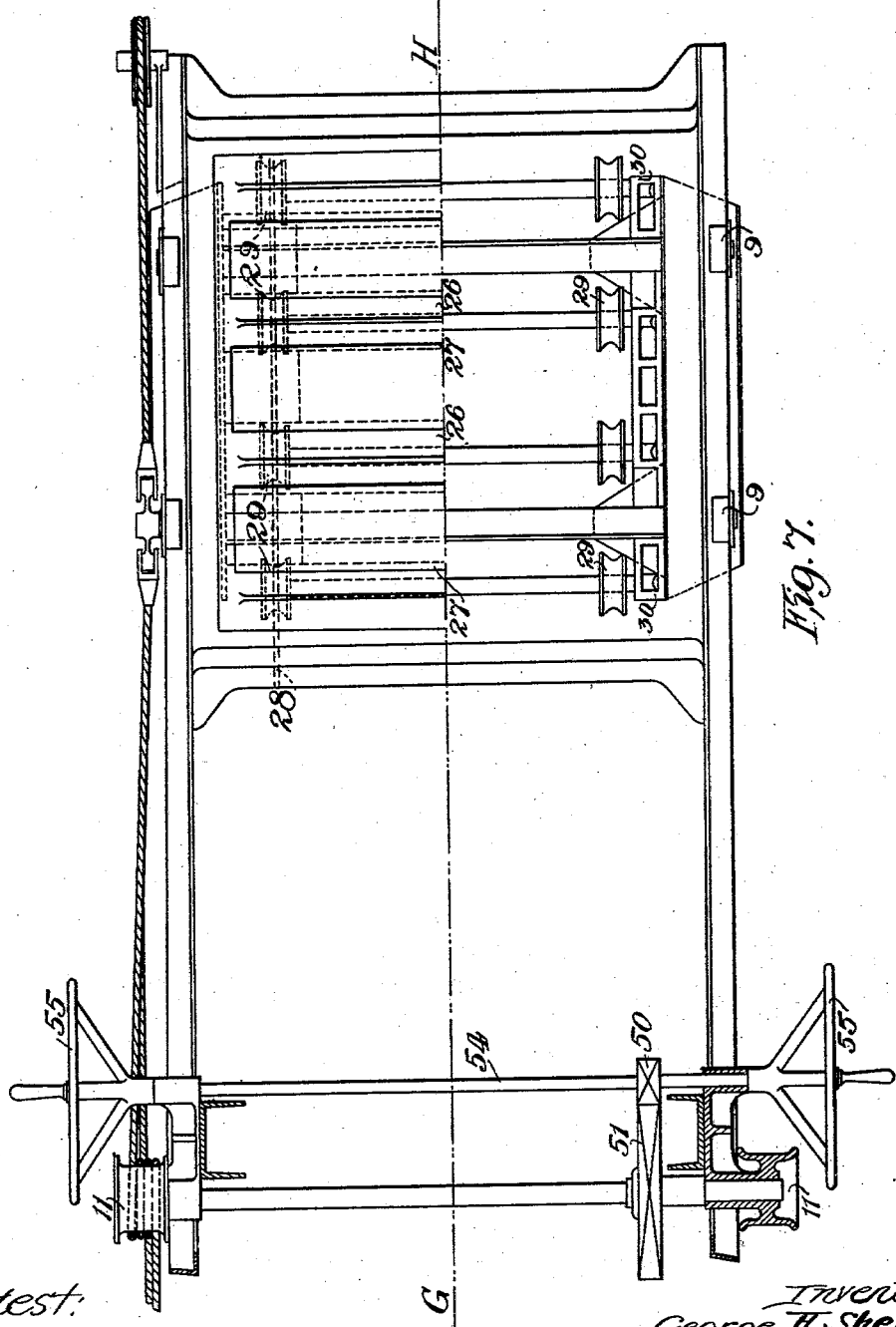

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 8.

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 9.
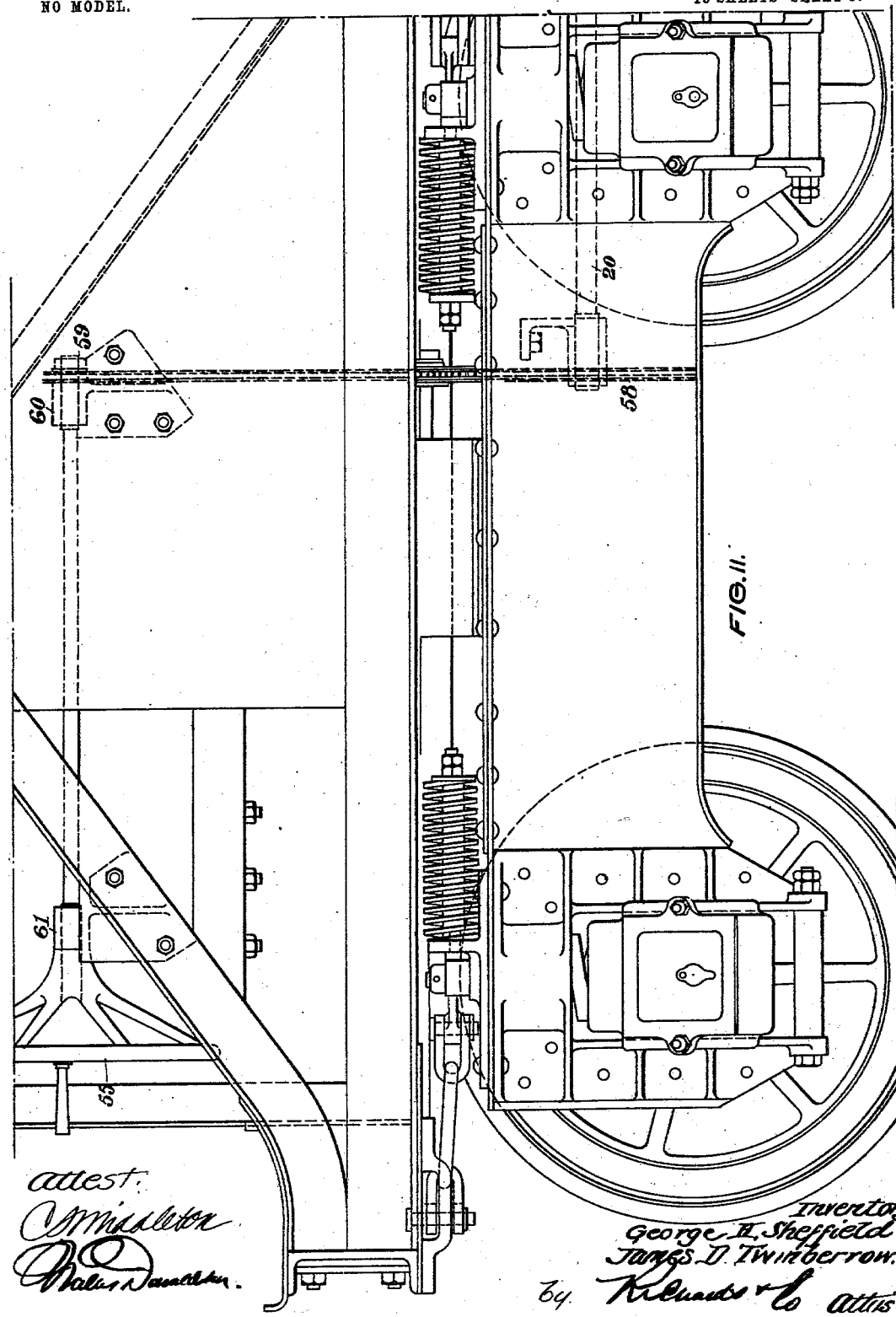

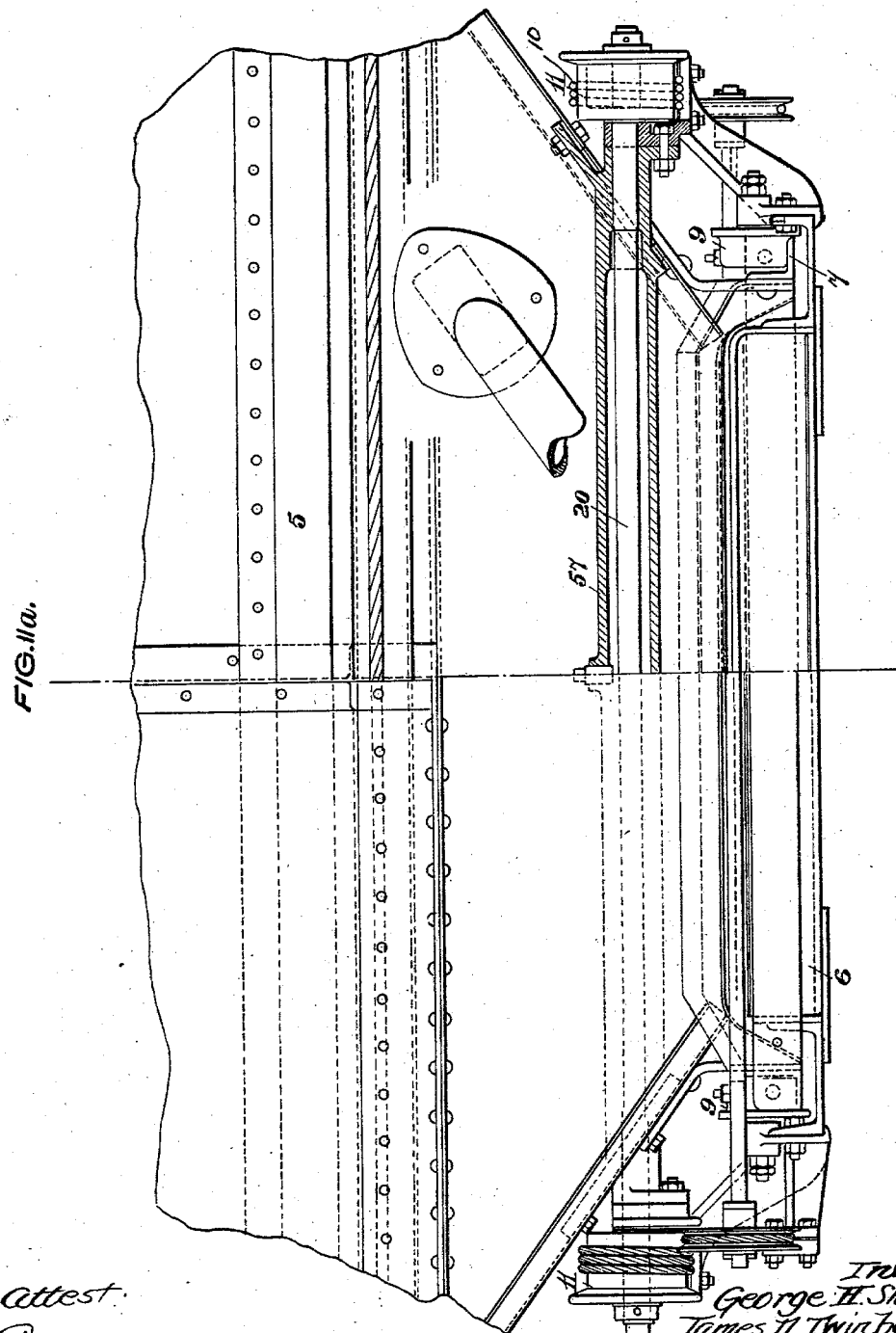

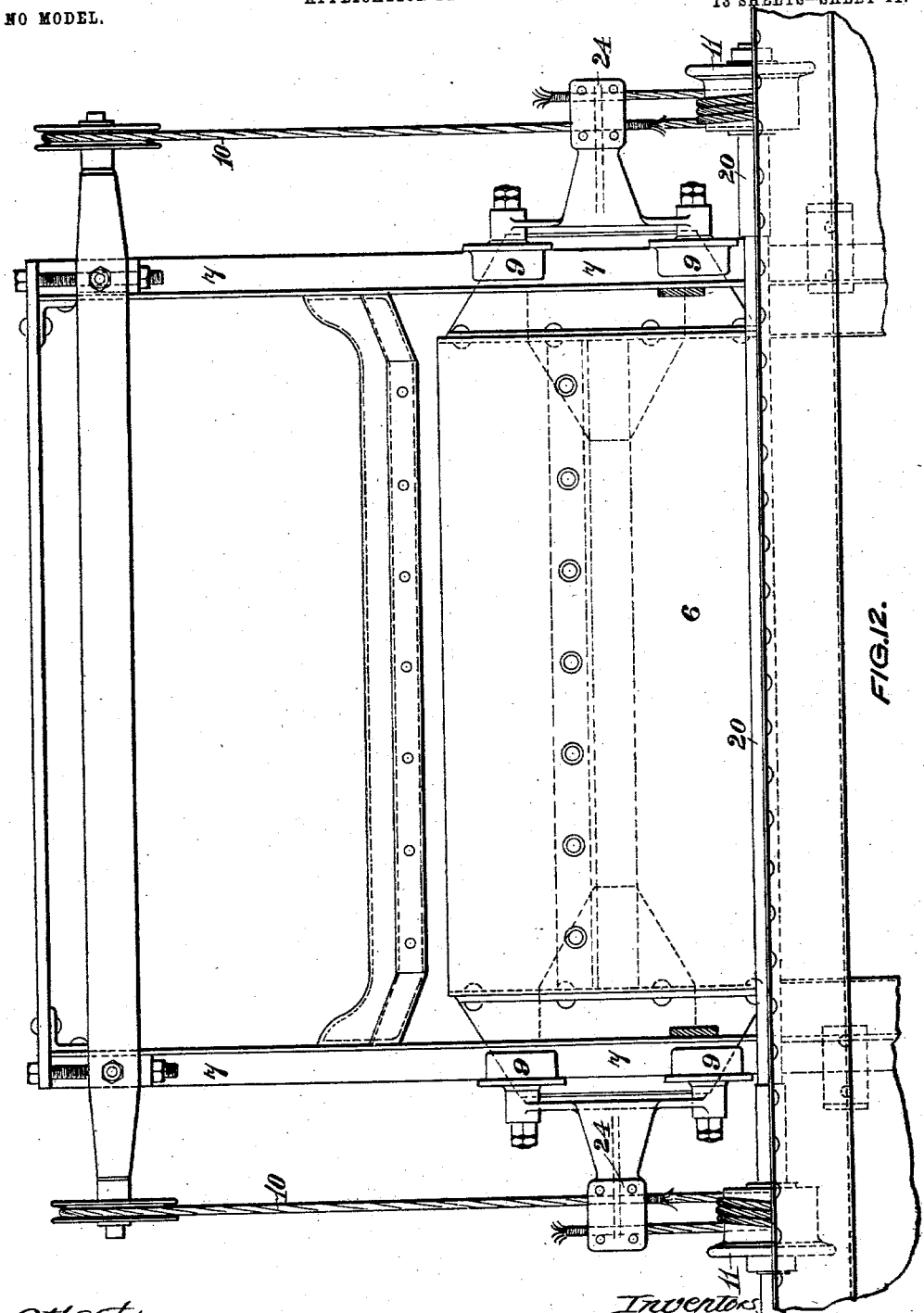

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 12.

No. 741,075. PATENTED OCT. 13, 1903.
G. H. SHEFFIELD & J. D. TWINBERROW.
DOOR FOR SELF DISCHARGING HOPPERS OF RAILWAY OR OTHER FREIGHT CARS.
APPLICATION FILED OCT. 19, 1901.
NO MODEL. 13 SHEETS—SHEET 13.
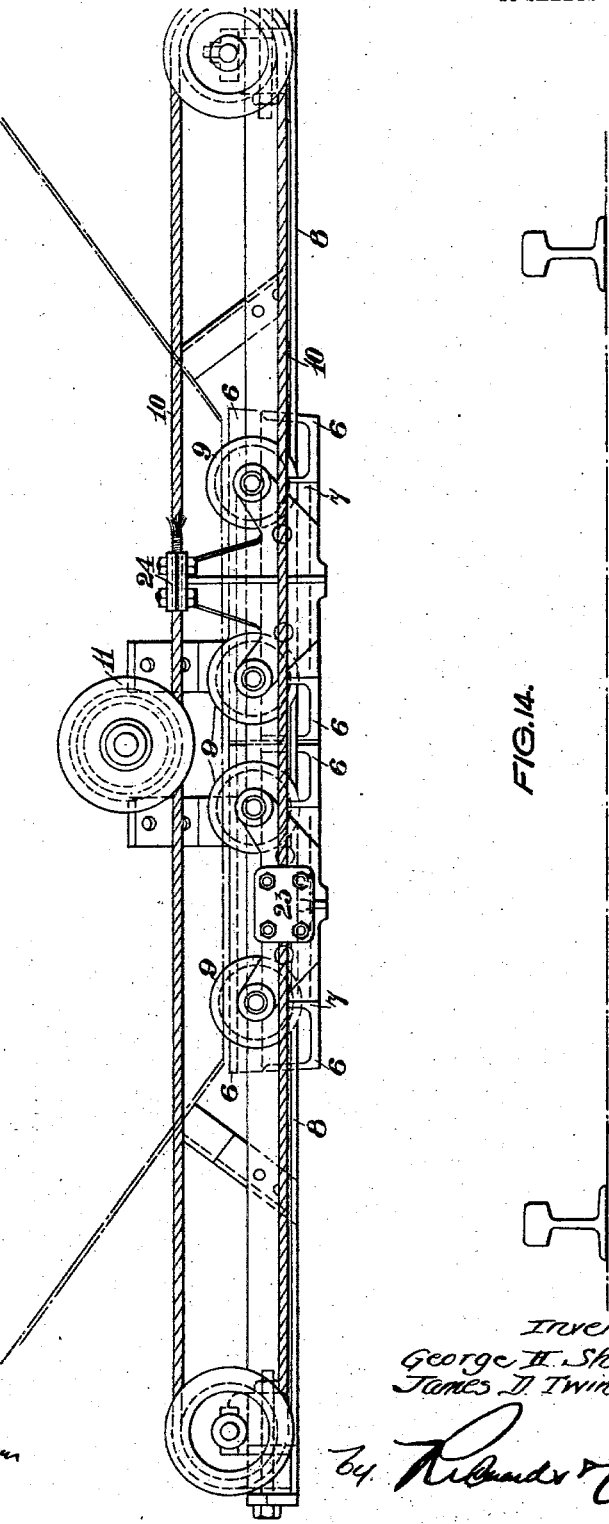

No. 741,075.

Patented October 13, 1903.

UNITED STATES PATENT OFFICE.

GEORGE H. SHEFFIELD AND JAMES D. TWINBERROW, OF NEWCASTLE-UPON-TYNE, ENGLAND.

DOOR FOR SELF-DISCHARGING HOPPERS OF RAILWAY OR OTHER FREIGHT-CARS.

SPECIFICATION forming part of Letters Patent No. 741,075, dated October 13, 1903.

Application filed October 19, 1901. Serial No. 79,301. (No model.)

*To all whom it may concern:*

Be it known that we, GEORGE HARRISON SHEFFIELD and JAMES DENIS TWINBERROW, civil engineers, subjects of the King of Great Britain and Ireland, residing at 13 Mosley street, Newcastle-upon-Tyne, in the county of Northumberland, England, have invented certain new and useful Improvements in and Connected with the Doors for Self-Discharging Hoppers of Railway or other Freight-Cars, (for which we have made application for Letters Patent in the German Empire, filed March 21, 1901,) of which the following is a specification.

This invention relates to the construction and method of actuation of discharging-doors for railway and other freight-cars, and has for its object the provision of rigid supports for the doors when closed and while sustaining the weight of the contents of the hoppers, such supports being so arranged as to relieve the opening-gear from any stress due to the weight of the contents and at the same time permitting of a convenient and snug stowage of the door when opened.

The accompanying drawings illustrate several modes of carrying the invention into effect.

Figure 2:
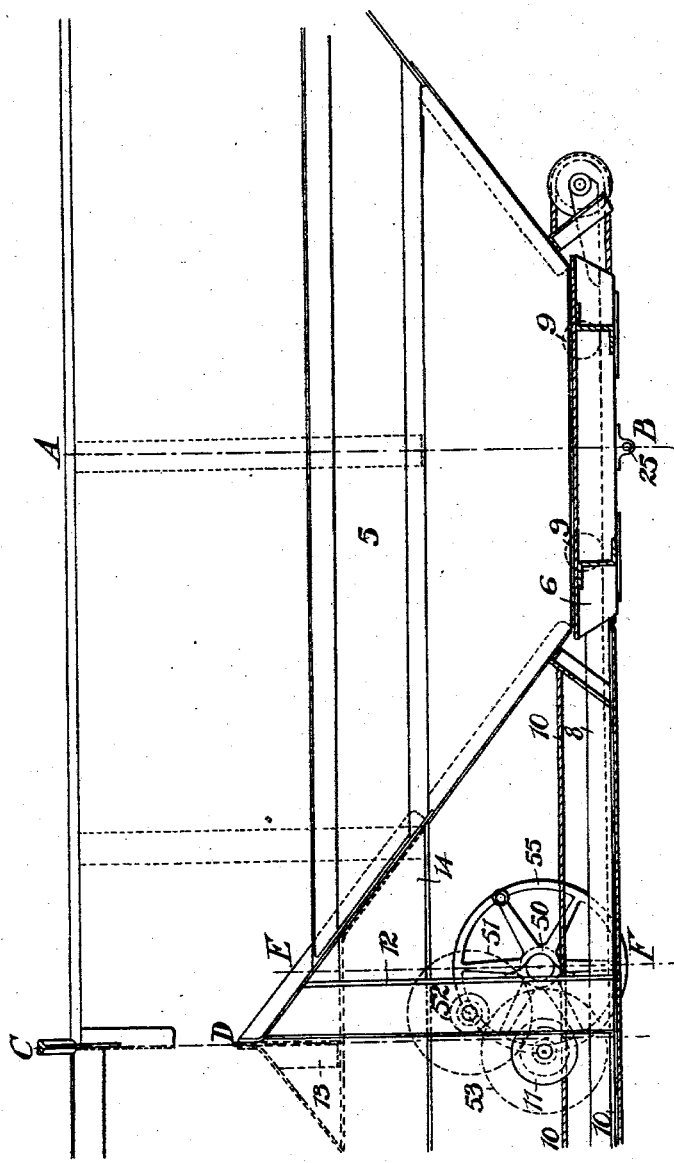
Figure 5:
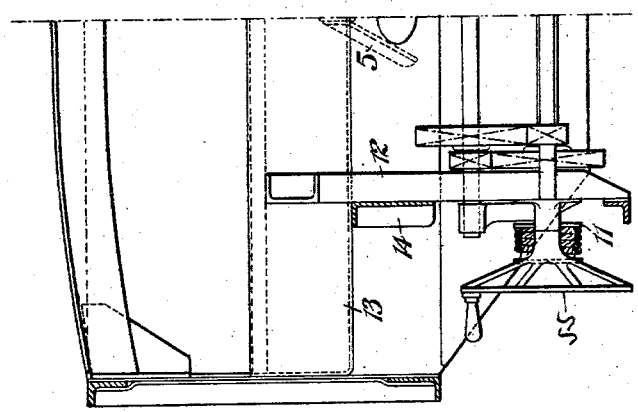
Figure 4:
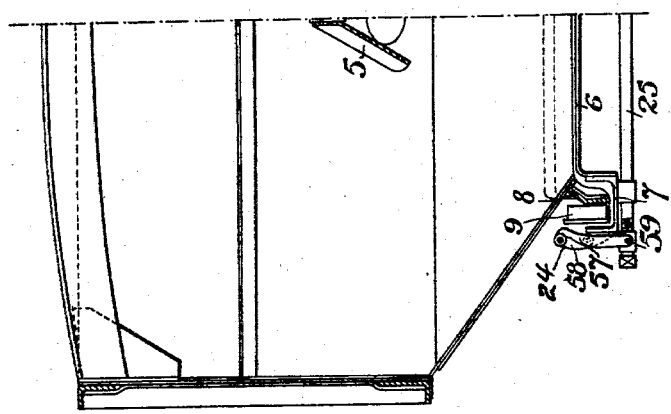
Figure 6:
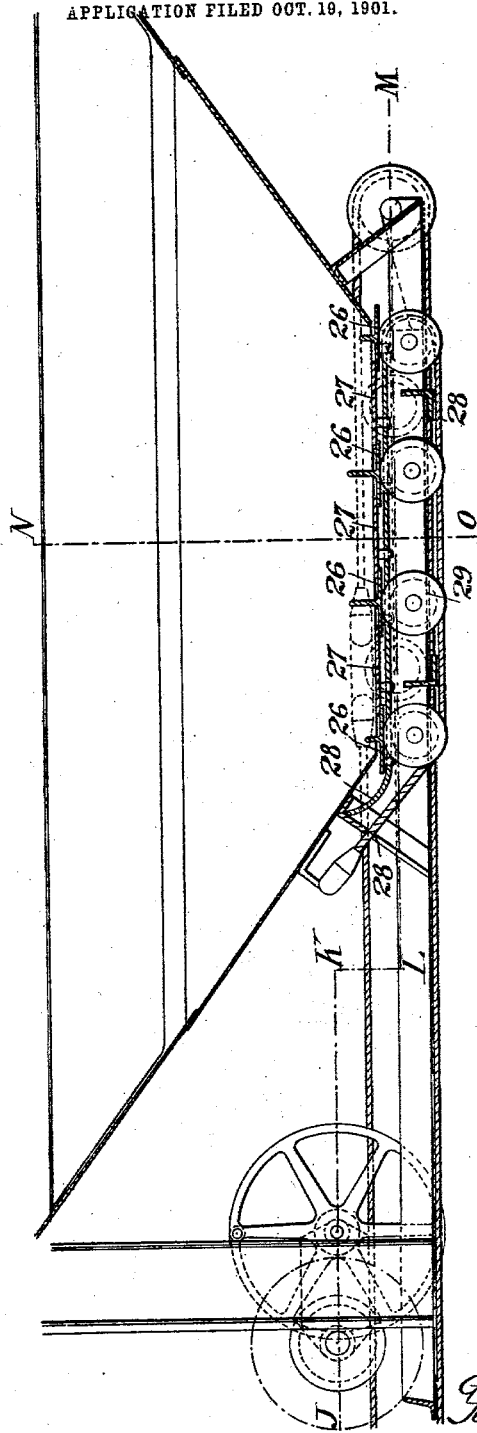
Figure 6A:
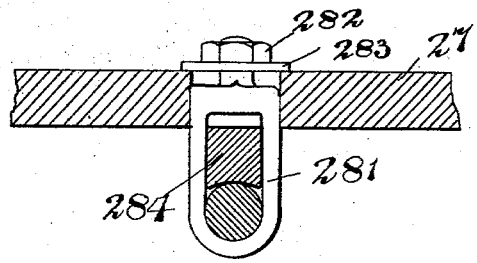
Figure 6B:
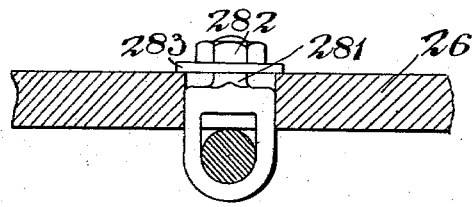
Figure 8:
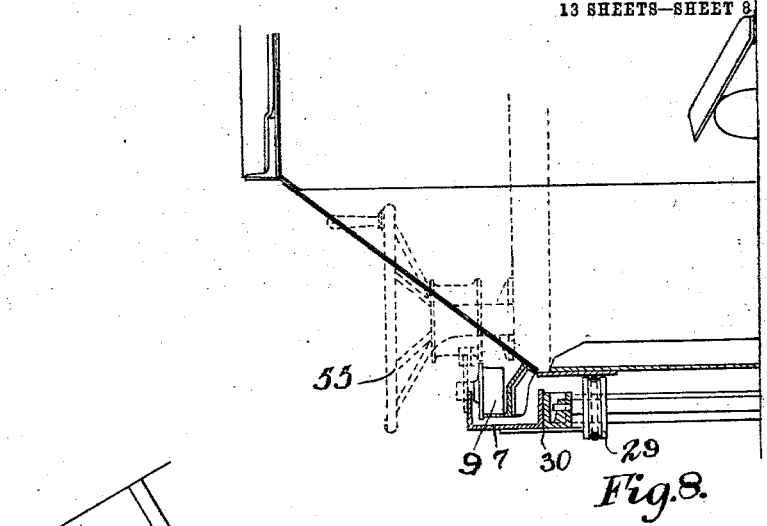
Figure 10:
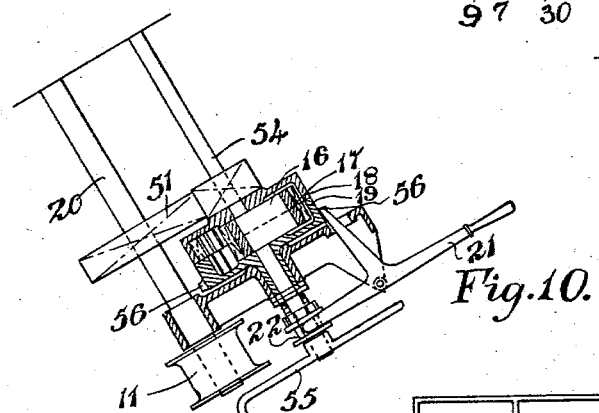
Figure 9:
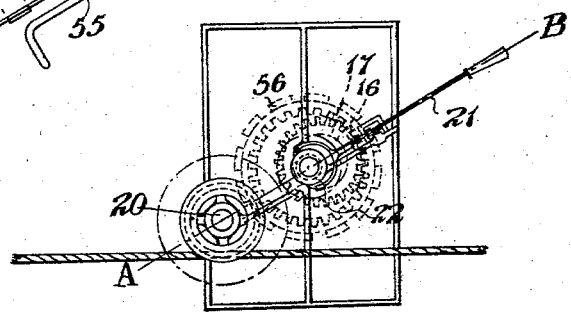
Figure 13:
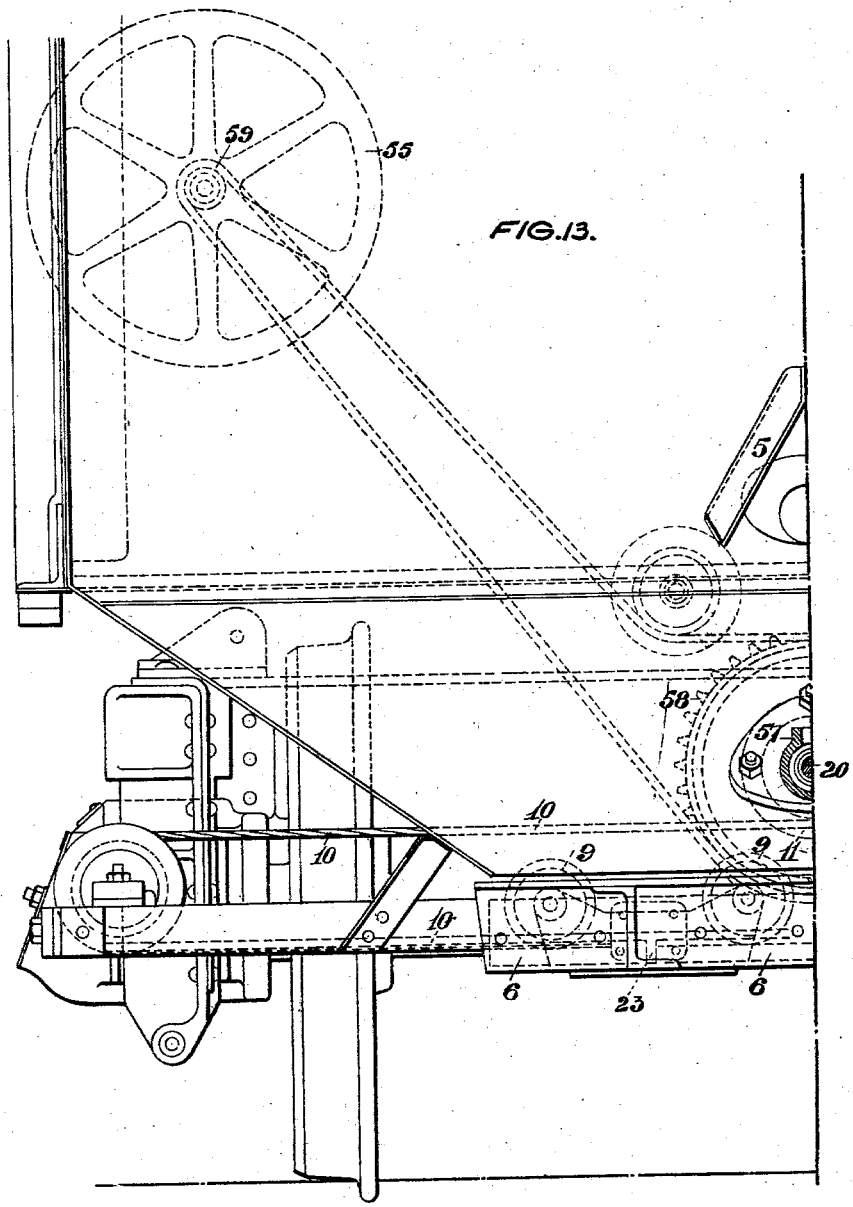

Figures 1 and 2 illustrate one mode of application to a double-hopper freight-car, each view showing one hopper, the first being in elevation and the second in mid-section. Fig. 3 is a half-sectional plan corresponding to Fig. 1. Fig. 4 is an end sectional elevation on the line A B, Fig. 2, illustrating the door-grips for the upper rope. Fig. 5 is an end sectional elevation on the line C D E F, Fig. 1. Figs. 6 and 7 illustrate a modification of the invention in which the door is constructed of stiffened metal laths, Fig. 6 being a sectional elevation on the line G H of Fig. 7, which is a half-sectional plan. Figs. 6ᵃ and 6ᵇ are detail views showing a method of attaching the ropes to the laths. Fig. 8 is an end sectional elevation on the line N O, Fig. 6. Figs. 9 and 10 are respectively elevation and sectional plan of a modification in the actuating-gear. Figs. 11 and 14 illustrate a further modification of the invention wherein the doors are opened transversely instead of longitudinally. Figs. 11 and 11ᵃ are partial front and sectional elevations; Fig. 12, a half-plan with car-body removed. Fig. 13 is an end elevation, and Fig. 14 is a detail end elevation of the doors.

In carrying the invention into effect according to one modification and as illustrated in Figs. 1 to 5, wherein the doors are of flat form, the end slopes of the hoppers are connected by a longitudinal member consisting of two plates 5, riveted together at their upper edges and splayed apart at the lower edges, and thereby forming a wedge-like surface offering small resistance to the downward passage of the coal or other material in the hopper. The angular disposition of the plates is arranged to relieve the doors to the desired amount of the weight of the superincumbent material. The internal space embraced by the plates is open from beneath, affording free access when unloaded to the draw-bar, brake-rods, train-pipe, or other fittings which may be conveniently arranged therein.

The hoppers are closed by flat doors 6, flanged at each side and connected to sills or channels 7, Fig. 4, the outer vertical flanges of which project beyond the outer edges of angle-bars 8, which are secured to the sides of the hopper and form tracks for the door-rollers 9, carried by pins or spindles rigidly attached to the outer flanges of the door-sills 7.

The doors are moved by means of endless ropes or chains 10, preferably arranged at each side of the doors. The upper line of each chain-loop is passed around a winding-drum 11, and the two doors are attached to the upper and lower line of the loop, respectively, in order that the rotation of the winding-drums will cause them to travel toward or away from each other, according to the direction of rotation, both doors moving toward the center of the car when opening and receding from each other when closing.

The drums 11 are rotated by a hand-winch mounted in brackets secured to vertical bars 12, connected at their lower ends to angle-bars 8 and at their upper ends to the vertical transom-plate 13 and further stayed by two members 14, fitted between the divergent slopes of the hoppers.

As it requires much more power to start the opening of the doors than it does to continue the opening movement after the doors have once been started, a double-speed gear is provided. A rotatable shaft 54 is mounted in bearings in the framework, so that it is free to be moved longitudinally a certain amount for the purpose hereinafter described. This shaft carries two hand-wheels 55 55, one on each end. It also carries a pinion 50, which is adapted to be put in gear with either of two wheels 51 or 53. Thus when it is desired to open the doors the shaft 54 is moved longitudinally until the pinion 50 is in gear with the wheel 51. This wheel is mounted on a secondary shaft $51^0$, carrying a pinion 52, gearing with a wheel 53 upon the shaft 20, carrying the winding-drums 11 11. It will thus be seen that the preliminary opening of the doors is effected through the train of gearing 50, 51, 52, and 53, which gearing affords a powerful purchase. When, however, the doors are once started, the shaft 54 is moved longitudinally until the pinion 50 is in gear with the wheel 53, whereupon a much less purchase but greater speed of opening is attained by the simpler train of gearing 50 and 53.

An alternative form of winch is shown in Figs. 9 and 10. The shaft 54 carries an eccentric 16, upon which is mounted a pinion 17, gearing with internally-toothed drums 18 and 19, having an unequal number of teeth. The drum 18 is geared through gear 50 51 directly to the shaft 20, carrying the winding-drums 11. The drum 19 is provided with projections 56 or notches on its periphery adapted to be engaged and fixed by an arm projecting from a lever 21, pivoted to the car-frame. The lever 21 also controls a clutch 22, adapted to lock the drum 19 to the shaft 54, the lever 21 simultaneously unlocking the drum 19 from the car-frame and locking it to the shaft 54, and vice versa. By this means two speeds are available, the slow speed for starting the movement of the doors and the quick speed for completing the movement.

In order that the doors may be independently actuated, means are provided whereby the chain or rope grips 23 24 may be released or locked independently and from either side of the car. Each rope-grip consists of a fixed jaw 58, Fig. 4, carried by the respective door-sill 7 and a pivoted jaw 57, one end of which is loosely pinned to a nut 59, traveled by rotation of a shaft 25, passing from one side of the car to the other and provided with square ends for the reception of keys or handles. Thus on the rotation of the shafts 25 from either side of the car the grips of the doors may be released or locked and either door worked independently or both doors worked simultaneously.

The friction of the upper flat surface sliding against the material in the hopper may be obviated by substituting a number of metal laths for the flat surface of the door.

This modification of the invention is illustrated in Figs. 6, 7, and 8. The door or shutter in this case consists of transverse bars or laths 26 27, the alternate plates 26 being suitably stiffened to support the load, the other plates 26 resting upon them; but, if desired, all the plates may be stiffened. The plates are linked together on their lower faces preferably by two loops of wire rope or chain 28, anchored to the outside of the hopper. The ropes 28 are secured to the laths in one convenient manner by means of eyebolts 281, through which the ropes are passed and tightly gripped when the bolts are screwed up by nuts 282, bearing on washers 283. As the alternate laths are at different levels and it is desirable to retain the ropes level, the alternate eyebolts are made of different lengths, the longer bolts being provided with packing-blocks 284, adapted to bear against the laths 27 to afford adequate resistance against which the ropes may be gripped.

The shutter is supported in place by rollers 29, fixed to spindles mounted in bearings on a frame 30, which is traveled by the winch-gear in a similar manner to the flat doors previously described. When the frame is drawn back to open the shutter, the end plate 26 falls over the end roller 29, and on continued movement of the frame the remaining plates follow in succession until the whole of the shutter has unrolled itself from the mouth of the hopper and is hanging in an inverted position from the loop of rope or chain encircling the rollers 29.

In some forms of freight-cars it may be desirable to arrange the doors to open transversely to the axis of the car. In such a case the invention is modified in the manner illustrated in Figs. 11 to 14. The hopper-opening is closed by two doors 6 6, constructed in a similar manner to those described in the first modification, being provided with rollers 9, traveling in transverse races 8, suspended from the hopper. The doors, as before, are opened and closed by a chain or rope drive 10, arranged on each side of the doors, but transversely to the longitudinal axis of the car, one door being fitted with rope-grips 24, engaging with the upper rope, and the other with similar grips 23, engaging with the lower rope, thus insuring opposite movements of the doors, which move toward each other when closing and away from each other when opening.

The chains or ropes 10 are driven off winding-drums 11, as in the previous modifications; but in this case the shaft 20, on which the drums are mounted, is preferably situated along the longitudinal axis of the car, passing through the hopper beneath the $\Lambda$-guard 5, but further protected by a casing 57. The shaft 20 is continued toward one end of the car and may be rotated by any suitable gear, such as a chain-drive 58 59, from a second shaft mounted in bearings 60 61 beneath the hopper and provided with a hand-wheel 55. When the transversely-operating system is to be applied to double hoppers, the shaft 20 may be continued in both directions to operate both sets of doors or a separate operating-shaft may be used for each set.

Having thus described our invention, what we claim as new, and desire to secure by Letters Patent, is—

1. In freight-cars having one or more hoppers, the combination of a flat discharge door or doors provided with rollers, races for the rollers secured to the hoppers or car-frame, rope or chain grips attached to the doors, endless ropes or chains on each side of the door or doors and windlass-gear for driving the same, substantially as hereinbefore described.

2. In freight-cars having one or more hoppers, the combination of sliding discharge door or doors, rope or chain drive for the same and a windlass having a double-speed gear, substantially as hereinbefore described.

3. In a freight-car having one or more hoppers provided with sliding discharge-doors operated by a chain or rope drive from a windlass-gear, means for actuating said windlass-gear at variable speeds comprising a driving-shaft provided with a hand wheel or lever and an eccentric upon which is mounted a pinion gearing with two annular wheels of unequal numbers of teeth, both annular wheels being loosely mounted on the driving-shaft, one carrying a pinion gearing directly with the windlass-shaft and the other having a clutch extension by which it is secured to the driving-shaft to obtain one speed, and having projections or notches on its periphery engaged by a locking-lever when another speed is required, which lever at the same time disengages the clutch, substantially as hereinbefore described.

4. In a freight-car having one or more hoppers provided with sliding discharge-doors actuated by a chain or rope drive, means for attaching the ropes to the doors capable of being operated from either side of the car comprising fixed jaws rigidly secured to the doors and movable jaws pivoted thereto and actuated by nuts traveling on cross-shafts transversely mounted in bearings beneath the car, substantially as hereinbefore described.

5. In a freight-car having one or more hoppers the combination of flexible discharge door or doors, each formed of a series of plates suitably stiffened and secured to loops of chain or rope anchored near one end of the hopper, guide-pulleys for said loops carried by a frame, friction-rollers and races for said frame and rope or chain drive and windlass-gear for traveling said frame in order to roll the door off or away from the mouth of the hopper, substantially as hereinbefore described.

It witness whereof we have hereunto set our hands in presence of two witnesses.

G. H. SHEFFIELD.
J. D. TWINBERROW.

Witnesses:
GEO. M. SHEPPARD,
J. B. MIDDLETON.